Patented May 13, 1941

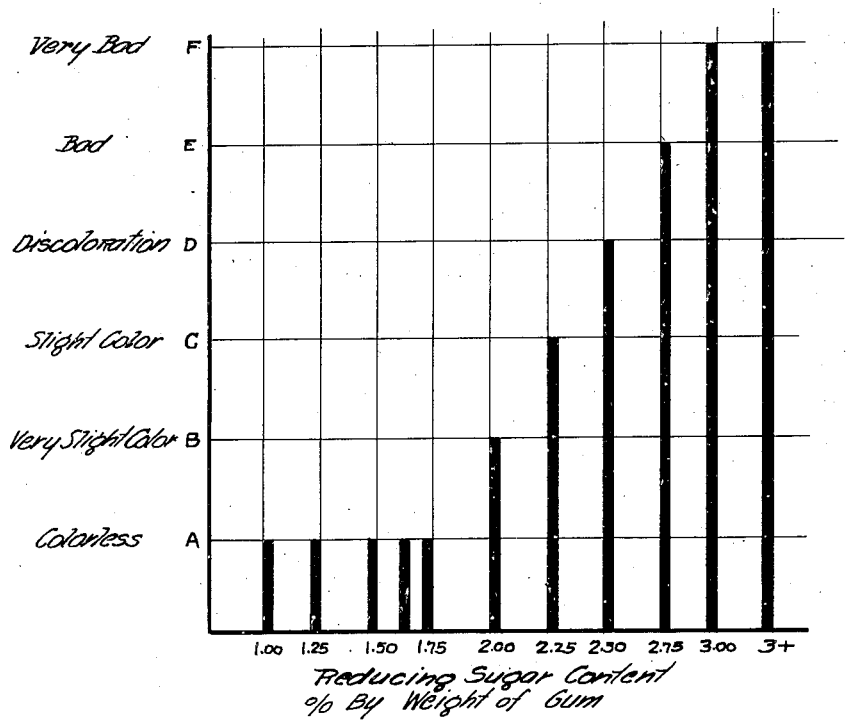

2,241,700

UNITED STATES PATENT OFFICE 2,241,700

ADHESIVE

Paul B. Davidson, Wilkinsburg, Pa., and Julius R. Adams, Westfield, Mass., assignors to Old Colony Envelope Company, Inc., Westfield, Mass., a corporation of Massachusetts Application April 19, 1938, Serial No. 202,882

3 Claims. (Cl. 134—23.4)

This application relates to improvements in paper adhesives and is directed more particularly to the provision of novel adhesives, commonly called gums, to be applied to paper in connection with the manufacture of envelopes.

This application is a continuation in part of an application Serial No. 17,129, filed by us on April 18, 1935.

The principal object of the invention is the provision of a paper adhesive which will not discolor and is properly fluid.

All envelope adhesives heretofore known have discolored considerably after the envelopes have been on the shelves or elsewhere for a length of time and this tendency has, we have found, prevailed in all types of climate and regardless of the conditions under which the envelopes are stored. We overcome this objection.

Furthermore, paper-adhesives must have special properties and characteristics particularly adapting them for use in the manufacture of envelopes. That is, it is the practice in the envelope industry to apply the gum to the paper by means of an envelope machine, wherefor the gum must not be pasty but must remain sufficiently fluid for an ample length of time so that it may be readily and efficiently applied by the machine.

We have found that a cause of discoloration is an objectionable reaction between certain elements in gums heretofore known and the more or less degraded protein in the sizings of the paper used to form the envelopes. More specifically, we have found that reducing sugars, which have always been present in gums hitherto used, react unfavorably with the paper itself so as to cause the above-mentioned discoloration.

That is to say, we believe the cause of discoloration is the formation of colored or humus-like substances due to the reaction between the reducing sugars in the adhesive and the more or less degraded protein in the paper sizing and this is regardless of whether the reducing sugars are added to the gum as such or are formed during the gum's preparation.

It should here be stated that as far as we can determine after considerable research no one has ever before even attempted to overcome this discoloration problem, much less solve it. Those skilled in the paper adhesive art have considered discoloration as an inevitable and necessary evil and have accepted it as something which cannot be prevented.

So ever-present has the discoloration problem been and so well-established was the thought that it could not be prevented that the N. R. A. code of 1933 for the envelope industry stated:

"* * * the envelope manufacturer cannot assume responsibility for discoloration due to gum on papers supplied by the customer or specified by him."

It has heretofore been common practise to depend upon sugars, which might be either present in the starch or added to the composition as a separate ingredient, for the fluidification of the gum and the prevention of formation of starch pastes or jellies. While sugars do facilitate the proper application of the gum by the envelope machines, these substances not only tend to crystallize on drying so as to destroy some of the gum's adhesive properties but they also react unfavorably with the paper as above explained.

Accordingly, it is also an object of the invention to provide a paper adhesive which will not deteriorate with age but which will, to the contrary, retain its adhesive properties. That is to say, the envelope adhesives of this invention do not become excessively dry so as to lose adhesive strength or tend to cause separation of the envelope flaps.

Various other objects and advantages of the invention will become more apparent after a reading of the following description and for purposes of convenience and completeness of disclosure, reference will be had to the accompanying drawing, wherein:

The figure is a chart to explain certain features of the invention.

The invention will now be more fully described.

Our invention consists broadly in providing paper adhesives which have as a base a quantity of partially-dextrinized starch and contain one or more of a group of fluidifying substances which are both capable of fluidifying, that is inhibiting objectionable gel formation, and incapable of bringing about the above-mentioned discoloration-forming reaction. More specifically, we combine with starch certain substances which will not only fluidify the starch but which do not form reducing compounds and hence do not react with the more or less degraded protein in the paper sizings to form colored compounds.

We have found that any gums which contain more than 2% by weight of reducing sugars do react unfavorably with the protein in the paper sizings so as to produce discoloration. This is readily seen from the accompanying chart which shows the results of carefully and scientifically conducted experiments.

It is clear that the moment the reducing sugar content of the gum becomes appreciably more than 2% by weight thereof objectionable discoloration is evident whereas gums containing less than 2% reducing sugars are colorless. The commercial disadvantages of discoloration seem to be too obvious to need explanation.

The tests whereby we proved the results shown in the chart were conducted as follows:

A number of pairs of strips of paper, all the same kind, were stuck together with various adhesives now commercially available and with the adhesives of this invention which we will later describe. These strips were aged naturally in various parts of the country and also some of each were placed in test tubes, sealed, and placed in an oven regulated to 60° C. for 48 hours.

Discoloration appeared in the strips which were not gummed with the adhesives of this invention so we proceeded to determine the reducing sugars in all of the sample gums.

This was done by diluting a sample of each gum with 100 cc. of water and precipitating the dextrins by adding 100 cc. of 98% ethanol, according to the method described as the "starch tentative" on page 385 of the third edition of the "Official and Tentative Methods of Analysis of the Association of Official Agricultural Chemists."

The dextrins were allowed to settle out of dispersion for 48 hours and then samples of the clear supernatent liquid were taken for the reducing sugar determination in accordance with the common and well-known method described as the "Defren's method" on page 74 of the second edition of "Methods of Organic Analysis" by Dr. H. C. Sherman.

However, for the gravimetric method for determining the reduced copper in the "Defren's method," we substituted the more accurate volumetric thiosulfate method which is the official method described on page 380 of the text of the Association of Official Agricultural Chemists mentioned above.

The results were, as stated, as shown in the chart and it is clear that the particular adhesives embodying the features of this invention did not show discoloration because the reducing sugar content was below 2%, all other things having been kept equal.

We have further found that there are particular types of dextrin or starch which are most suitable for accomplishing our purpose. While, as a general rule, best results can be obtained if the reducing sugar content of the dextrin itself before cooking is below 2%, it is necessary that the final cooked gum contain less than 2% of reducing sugar to completely avoid discoloration.

That is to say, the hydrolysis that takes place during the normal cooking of the gum may objectionably increase the reducing sugar content even though the content of the original dextrin was low. Accordingly, we preferably use a partially-dextrinized starch which is of such a composition that when it is cooked for about thirty minutes at a temperature of around 98° C. with an approximately 40% concentrated solution of acetic acid, it will have, upon cooling, a reducing sugar content of less than, or at least not appreciably more than, 2% by weight.

Another example of a preferred dextrin is one which, when cooked for about thirty minutes at a temperature of about 85° C. with the same acetic acid, will not have a reducing sugar content of more than 2% by weight. That is to say, of all the variously dextrinized starches which are commercially available those which have the just-referred-to qualifications are most suitable for the practise of this invention.

Hereafter when using the terms "dextrin" or "partially-dextrinized starch" we mean just such substances as have been above defined. We found, however, that while such cooked mixtures as have just been described have the desired low reducing sugar content, they are not sufficiently fluid for application to the paper by the envelope machines.

Accordingly, it was incumbent upon us to fluidify the mixtures in a way which would not increase appreciably this reducing sugar content so as to later produce the objectionable discoloration. As stated, the common way to fluidify heretofore has been to add more sugar but this, of course, increases the reducing sugar content so that the resulting adhesive would have all of the objections which our invention overcomes.

There are various substances inert to more or less degraded protein which may be used to replace the sucrose and at the same time provide the proper fluidity. We have found that ureas, such as carbamide, thiourea, and salts of guanidine, not only render the adhesive properly fluid but prevent the formation of the objectionable humus-like substances above-referred to.

It is immaterial whether condensation products are formed with the carbohydrate constituents during the manufacture of the gum, and it is a fact that the homologous mixture produced by the addition of our fluidifying substances to partially-dextrinized starch and water produces the desired result as long as the total reducing sugar content of the gum is less than 2% by weight.

Other substances which may be used to replace the sugars or sucrose in the gums and which will not react unfavorably with the proteins in the paper are the amides of monocarboxylic acid such as acetamide, carbamates such as ethyl carbamate, water-soluble ethers such as dioxan, and polyhydroxy alcohols such as sorbitol and mannite.

According to the preferred form of the method of this invention, water and the partially dextrinized starch are mixed intimately. If desired, a volatile acid, such as acetic or the like, may be introduced into the mixture to aid in the hydrolysis of the starch and the mixture is then agitated so that the ingredients thoroughly blend with one another.

The composition is then heated in any well-known manner to within a range of preferably from 160° to 212° F., which temperature is preferably maintained for from 20 to 60 minutes. The length of time during which the gum is cooked depends, of course, on the size of the batch, the temperature, the equipment used and various other factors.

In any event, it is desirable that the mixture be cooked only until the hydrolysis of the starch to the desired degree of dextrinization is complete and not for such a length of time that the reducing sugar content be substantially increased.

We now add the fluidifying agent but it is here desired to point out that we do not wish to be limited to any specific order in which the above ingredients may be added. It only is essential that the fluidifying agent be added to the composition at some time since it is this substance which is non-reactive with the protein-containing sizings of paper that is important.

As final steps in the process the gum is preferably chilled to about 100° F., or below, after which the mixture is ready to be drawn.

While the proportions of the above ingredients may be greatly varied, very favorable results have been obtained when staying within the following approximate ranges of proportions by weight:

|  | Per cent |
|---|---|
| Water | 10 to 18 |
| Partially dextrinized starch | 50 to 62 |
| Fluidifying agent | 3 to 10 |

If acetic acid or some other volatile acid is added, about 10 to 20% thereof may be used. If it is desired to include glycerine, about 4 to 10% thereof may be used.

While we have described the invention in great detail and with respect to the present preferred form thereof, it is not desired to be limited thereto since many changes and modifications may be made therein without departing from the spirit and scope of the invention. What it is desired to claim and secure by Letters Patent of the United States is:

1. As a new article of manufacture, a paper-adhesive of the class described consisting of partially-dextrinized starch dispersed in a solution of a volatile acid and a fluidifying agent consisting of a water-soluble organic compound of such a nature and under such conditions that the total reducing sugar content of said adhesive is limited to a maximum percentage by weight thereof of about 2%, said fluidifying agent consisting of a urea.

2. As a new article of manufacture, a paper-adhesive of the class described consisting of partially-dextrinized starch dispersed in a solution of a volatile acid and a fluidifying agent consisting of a water-soluble organic compound of such a nature and under such conditions that the total reducing sugar content of said adhesive is limited to a maximum percentage by weight thereof of about 2%, said fluidifying agent consisting of a urea and said adhesive including from 50 to 62% by weight of the partially-dextrinized starch, from 10 to 20% by weight of the volatile acid, from 10 to 18% by weight of water, and from 3 to 10% by weight of the said fluidifying agent.

3. As a new article of manufacture, a paper-adhesive of the class described consisting of a dispersion in a volatile acid solution of a starch which has been dextrinized only to such an extent that it has when cooled after having been cooked for about thirty minutes at a temperature of around 98° C. with an approximately 40% concentrated solution of acetic acid, a reducing sugar content of not more than 2% by weight, and a fluidifying agent consisting of a urea.

PAUL B. DAVIDSON.
JULIUS R. ADAMS.